(12) United States Patent
Dan et al.

(10) Patent No.: US 10,035,311 B1
(45) Date of Patent: Jul. 31, 2018

(54) METHOD FOR MANUFACTURING A LEAK TIGHT POROUS COMPONENT

(71) Applicant: GM GLOBAL TECHNOLOGY OPERATIONS LLC, Detroit, MI (US)

(72) Inventors: Alexander John Dan, Berkley, MI (US); Jeffrey A Rock, Rochester Hills, MI (US); Edward Gerard Strucinski, II, Memphis, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 15/401,367

(22) Filed: Jan. 9, 2017

(51) Int. Cl.
| | |
|---|---|
| *B29C 73/02* | (2006.01) |
| *G01M 3/06* | (2006.01) |
| *G01M 3/20* | (2006.01) |
| *B29K 105/04* | (2006.01) |
| *B29K 101/12* | (2006.01) |

(52) U.S. Cl.
CPC ............ B29C 73/02 (2013.01); G01M 3/06 (2013.01); G01M 3/20 (2013.01); *B29K 2101/12* (2013.01); *B29K 2105/04* (2013.01)

(58) Field of Classification Search
CPC ............. B29C 73/02; B29K 2101/12; B29K 2105/04; G01M 3/06; G01M 3/20
See application file for complete search history.

(56) References Cited

U.S. PATENT DOCUMENTS

| | | | | |
|---|---|---|---|---|
| 3,939,695 A | * | 2/1976 | Booth | G01M 3/226 73/40.7 |
| 4,601,194 A | * | 7/1986 | Miller | E21B 47/1015 73/40.7 |
| 2009/0165534 A1 | * | 7/2009 | Kohno | G01M 3/2815 73/49.1 |

* cited by examiner

*Primary Examiner* — Nathan H Empie

(57) ABSTRACT

A method for manufacturing a leak tight porous component includes the steps of forming a porous component; applying a first application of a surface sealant layer to the component; providing pressurized gas into a wall of the component via a known leak in the surface sealant; applying liquid to the component while pressurized gas is flowing into the wall of the component via the known leak. The method further includes the steps of inspecting the component for the formation of bubbles; identifying a new leak area in the component; removing at least a substantial amount of liquid from the component; and applying a second application of surface sealant to the new leak area.

19 Claims, 3 Drawing Sheets

US 10,035,311 B1

METHOD FOR MANUFACTURING A LEAK TIGHT POROUS COMPONENT

TECHNICAL FIELD

The present disclosure relates to manufacturing method for producing a leak tight component, particularly where the components have a naturally porous structure such as 3D printed parts.

BACKGROUND

Porous components, such as but not limited to 3D printed parts, may be formed into parts which are required to transfer or hold fluids in a leak tight manner. A popular method to quickly produce a leak tight part is to manufacture a component having a porous structure (such as a 3D printed part) via a 3D printer. Then, due to the porous nature of the component, a sealant is applied to the part by submerging the entire part in a tank of a surface sealant such as an epoxy. Subsequently, in order to make sure that there are no leaks in the surface sealant, the part may then be fixtured so that the fluid inlet and fluid outlet openings for the part are sealed off. After the interior cavity of the part is completely sealed, pressurized air or nitrogen is supplied into the internal cavity of the part while the part is submerged in water. Accordingly, the charged or pressurized part is submerged in a water tank and an operator must watch for escaping bubbles on the exterior surface of the part. This segment of the traditional manufacturing method wherein leaks are located in the part is called the water-immersion bubble test—also called "bubble testing" or "dunking." The larger and more frequent the bubbles, then leakage in the surface sealant is bigger. Moreover, relatively small bubbles demonstrate that a smaller leak exists in the part. Where the part has multiple separate passages inside the part, the process of fixturing and sealing for each separate passage/area must be repeated again until all separate passages/areas have been addressed.

After the leaks on the exterior of the part are identified, the part is then removed from the water, dried off, and then the entire part is submerged again in a surface sealant so as to apply surface sealant again to the entire part. The process may have to be repeated in order to make sure that there are no more leaks in the exterior surface sealant.

However, as demonstrated, this traditional manufacturing process requires the step of fixturing the part to completely seal off the interior cavity of the part for a bubble test, and then applying surface sealant again to the part by submerging the entire part again in a tank of surface sealant—after detecting any leaks in the external surface sealant during the bubble test. Accordingly, these traditional manufacturing process steps make it rather challenging to manufacture and produce a leak tight part in a time-efficient and cost-efficient manner. Moreover, this traditional process only identifies leaks that exist on the exterior surface of the part (not on the interior surface of the part).

In conclusion, the traditional manufacturing process fails to detect new leaks in the surface sealant on both the interior surface of the part as well as the exterior surface of the part. Moreover, the traditional manufacturing process is particularly time consuming due to the need to fixture the part and seal off the openings, and particularly expensive due to the need to re-dip the entire part in a surface sealant to close all new leaks in the surface sealant of the part.

Accordingly, there is a need for an improved and more cost/time efficient methodology to manufacture a leak tight part.

SUMMARY

Accordingly, the present disclosure provides a method for manufacturing a leak tight component. The manufacturing method includes the steps of forming a porous component; applying a first application surface sealant to the component; providing pressurized gas into the component via a known leak; submerging the component in a liquid while pressurized gas is flowing into the walls or structure of the component via the known leak. The method further includes the steps of inspecting the interior and exterior surfaces of the component for the formation of bubbles; identifying at least one new leak 34 area in the component; removing at least a substantial amount of the liquid from the component; and applying a second application surface sealant directly to the new leak 34 area(s).

The present disclosure also provides another embodiment method which includes the steps of forming porous component, applying a first application surface sealant to the porous component; introducing a known leak to first application surface sealant; providing pressurized gas into the walls or structure of the component via the known leak; applying liquid to the component while pressurized gas is flowing into the walls/structure of the component via the known leak; inspecting the interior and exterior surfaces of the component for the formation of bubbles; identifying a new leak 34 or a new leak area 34 in the first application surface sealant of the component; removing at least a substantial amount of liquid from the component; and applying a second application surface sealant directly to the new leak/leak area 34.

Each of the above methods further contemplates any of the following non-limiting options: (1) the component may optionally be a 3D printed part formed by an FDM machine; (2) the first application surface sealant and the second application surface sealant may be optionally performed by brushing or spraying; (3) applying liquid to the component via submerging the component in a liquid or brushing on a soapy-like liquid onto the component surfaces; (4) the pressurized gas, may but not necessarily be helium or air; (5) a sealed fitting may be implemented at the known leak in the first application surface sealant in order to supply pressurized gas to the walls/structure of the component; (6) the known leak in the first application surface sealant may optionally be created by an operator by attaching a part (such as a threaded fastener) to the component; and (7) the surface sealant may be an epoxy.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Figure 1:
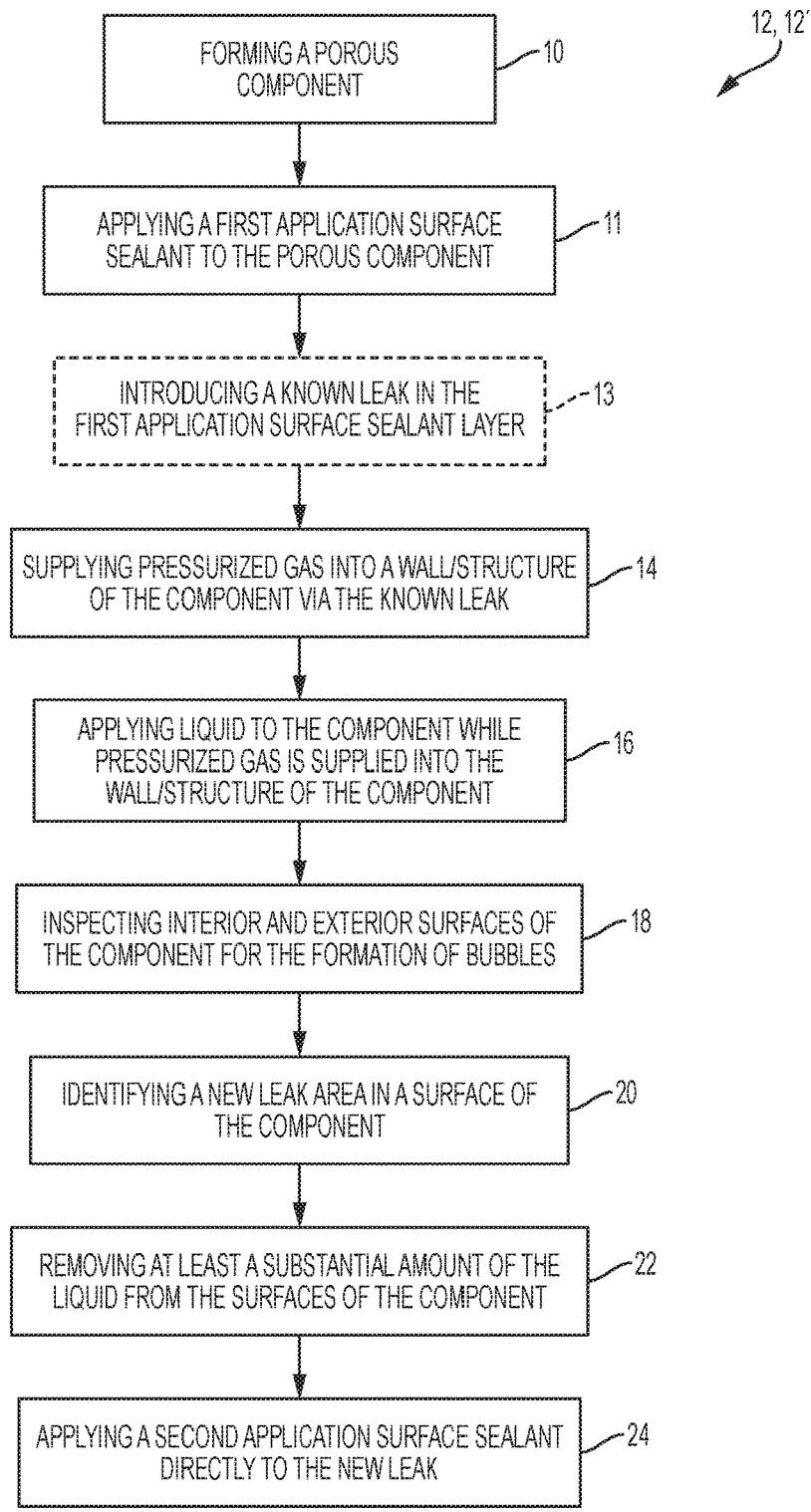
FIG. 1 is a flow chart illustrating a non-limiting exemplary manufacturing method of the present disclosure.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

Figure 2:
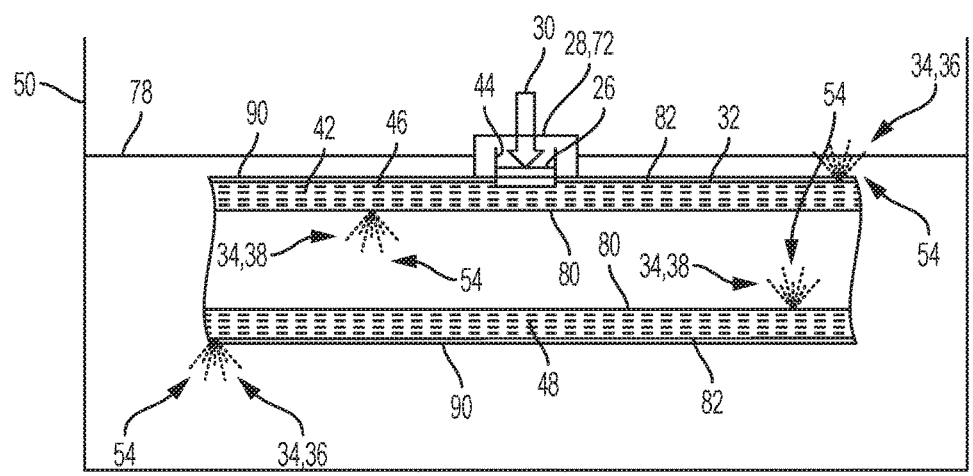
FIG. 2 is a cross sectional view of an example component undergoing a step in the manufacturing method.
Figure 3:
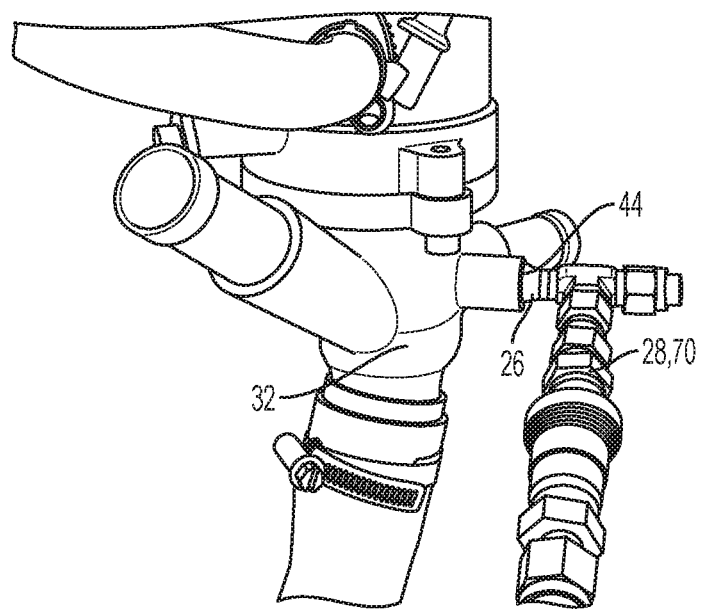
FIG. 3 is a perspective view of another example component having pressurized gas flowing into the walls of the component.

As shown in the non-limiting example of FIG. 1, the present disclosure provides a time-efficient and cost-efficient process 12 for manufacturing a leak tight component 32 (shown in FIGS. 2 and 3). The present disclosure further contemplates that the component 32 is formed 10 by a machine (such as an FDM machine) and has a porous structure 48—such as, but not limited to the porous structure 48 in the 3D printed parts. It is understood that the term "porous" as used in this disclosure simply means that there are internal passages or cavities within the structure such that a pressurized gas may travel through the structure.

In the example of 3D printed parts, these porous components 32 are formed from CAD data by using a material extrusion process. The CAD data may be implemented in an FDM (Fused Deposition Modeling) machine such that the model in the CAD data is sliced layer by layer. Then, software in the FDM machine generates toolpaths. The FDM machine further drives a thermoplastic filament into a heated liquefier such that the plastic reaches a flowable state and is extruded through a small diameter tip. During the deposition of the material for the part, the tip moves in the X and Y directions to create a layer consisting of contours and rasters. Then, after a layer is created, the bed of the FDM machine drops down a layer so that the tip could then create a new layer over the previously created layer. This 3D printing process of creating layers of contours and rasters results in pathways 42 being generated throughout the walls 46 of 3D printed parts thereby making the component 32 rather porous throughout such that a pressurized gas can travel throughout the structure 48 or walls 46 of the component 32. Therefore, while a 3D printed part may be formed in an FDM machine rather quickly, additional manufacturing steps are required to provide a leak tight component 32.

Accordingly, in a first embodiment of the present disclosure, a machine such as but not limited to an FDM machine may form a porous component 32 as described above. In order to leak tight the porous component 32, a surface sealant such as an epoxy may be applied 11 to the component 32 via a first application. The first application of surface sealant may be performed in a variety of ways which include, but are not limited to: submerging the component 32 in the surface sealant, brushing on the surface sealant, spraying the surface sealant onto the component 32, or the like.

Once surface sealant has been applied to the component 32, pressurized gas 30 may be supplied 14 into the porous walls 46 of the component 32 via a known leak (crack or opening) in the first application surface sealant layer 90. It is understood that the known leak in the first application surface sealant layer 90 (or surface sealant 90) of the component 32 may be manually created by an operator, automatically created by a machine, or may be identified by an operator via a traditional bubble test. It is understood that an operator or machine, may create a known leak in the surface sealant by attaching another part to the component 32 such as a threaded insert. When a threaded insert is attached to the component 32 having a first application of surface sealant layer 90, the surface sealant layer 90 is opened or cracked due to the engagement of the threaded insert with the component 32. Accordingly, an opening 44 (or a known leak 44) in the surface sealant is created such that pressurized gas 30 may access the wall of the component 32. This opening may serve as a known leak in the surface sealant of the component 32. Alternatively, a known leak in the surface sealant may be identified in the part 32 by performing a traditional bubble test.

Once the known leak (opening in the surface sealant) is identified, an operator may engage a seal tight fitting with the known leak in order to supply pressurized gas 30 to the wall of the component 32. As described earlier, a porous component 32 such as a 3D printed part includes pathways throughout the structure 48 of the part thereby allowing the pressurized gas 30 to travel throughout the structure 48 of the part. The pressurized gas 30 may be air, helium or other gas depending on the material used to form the part. The seal tight fitting 28 may come in a variety of forms such as, but not limited to a clamp-on component 32 (shown schematically as 72 in FIG. 2), a hose attachment (shown as 70 in FIG. 3) which engages with a threaded fitting (shown as 26 in FIG. 2), or the like. As the pressurized gas 30, such as helium travels throughout the walls 46 of the part, a liquid may be applied to the component 32 (having the first application of surface sealant). The step of applying 16 the liquid to the component 32 may be performed in a variety of ways such as, but not limited to: (1) submerging the gas charged component 32 into liquid such as water 78; (2) brushing on a soapy-like liquid onto the gas charged component 32; (3) partially submerging the gas charged component 32 into a liquid 78—such as water. It is further understood that the pressurized gas 30 may exit the walls 46 of the component 32 anywhere there is a leak in the surface sealant. Accordingly, the operator is able to inspect the interior and exterior surfaces 80, 82 of the component 32 to locate bubbles 54 emerging from the surface 80, 82 of the component 32 and thus, identify 20 a new leak 34 in each location where bubbles 54 form.

Accordingly, an internal leak 38 in the surface sealant may be identified in an internal cavity wall/surface 80 of the component 32 as shown in FIG. 2. An external leak 36 in the surface sealant may also be identified on an external surface wall 82 of the component 32. Any leaks in the internal/external surfaces of the component 32 are demonstrated due to bubbles 54 emerging from the component 32 as the pressurized gas 30 escapes the wet component 32 via the leak. Accordingly, the present disclosure provides for a method 12 which can specifically target both internal and external leak locations in the surface sealant for an operator.

Once the operator inspects the interior and exterior surfaces of the component 32 for the formation of bubbles 54 and identifies at least one new leak 34 area in the interior/exterior surface sealant of the component 32, the operator may remove 22 at least a substantial amount of the liquid from the component 32. This step of removing 22 the liquid 78 from the component 32 may involve rinsing and then drying a soapy like liquid off of the component—where a soapy like liquid substance was brushed onto the component. Alternatively, the step of removing 22 the liquid from the component may involve the operator removing the component from a tank 50 of water 78 or other liquid and then drying the component. In yet another non-limiting example alternative, the liquid 78 may be removed by use of an absorbent material such as a cloth. Where a second application of surface sealant does not require a component surface to be completely dry, it is understood the step of drying the component may be omitted.

Noting that the manufacturing method 12, 12' of the present disclosure identifies specific locations for leaks in the surface sealant, an operator or a machine may then simply apply 24 second application surface sealant via a second application directly (in a targeted manner) to the identified leak areas on the component—instead of applying surface sealant again to the entire component. The step of applying 24 a second application surface sealant to the identified leak area(s) may be performed by brushing on surface sealant onto the identified leak area(s), spraying on surface sealant onto the identified leak area(s), or the like. It is understood that the targeted second application of the surface sealant reduces manufacture time and cost given that the entire component is no longer dipped into the surface sealant. Moreover, due to the targeted second application of the surface sealant, the drying time for second application of the surface sealant is reduced.

The present disclosure also provides another embodiment for a method 12' for manufacturing a leak tight porous component. This second embodiment method 12' includes the steps of forming 10 a porous component, applying 11 a first application surface sealant 90 to the porous component; introducing 13 a known leak to the component; supplying 14 pressurized gas 30 into the component via the known leak; applying 16 liquid to the component while pressurized gas 30 is flowing into the component via the known leak; inspecting 18 the interior and exterior surfaces of the component for the formation of bubbles 54; identifying 20 a new leak 34 area in the component; removing 22 liquid from the component; and applying 24 surface sealant directly to the new leak 34/leak areas 34.

Unlike method 12, manufacturing method 12' contemplates the step of the operator/system deliberately creating or introducing 13 the "known leak" 44 into the first application surface sealant 90. In order to avoid having to locate a "known leak" via a preliminary bubble test as described in one of the many aspects of the first embodiment method 12, the second embodiment manufacturing method 12' is also shown in FIG. 1 where method 12' includes step 13 in the manufacturing method.

The methods 12, 12' of the first and second embodiments may each be modified by increasing the internal pressure in increments may increase the probability of finding a leak and can be less time-consuming in pinpointing the leak. Additionally, a detergent may be added to the water 78 to decrease surface tension, which helps to prevent the leaking gas from clinging to the side of the component. Moreover, using different gases (e.g. helium) and/or liquids may give some advantages in system performance, but at a cost disadvantage. In yet another embodiment of the present disclosure, a method to manufacture a leak tight porous component includes the steps of forming a porous component; applying a first application of a surface sealant layer to the component; providing pressurized gas into a wall of the component via a known leak in the surface sealant; applying dyed liquid to the component while pressurized gas is flowing into the wall of the component via the known leak. The method further includes the steps of inspecting the component for the formation of bubbles; identifying a new leak area in the component; removing at least a substantial amount of liquid from the component; and applying a second application of surface sealant to the new leak area.

This embodiment using dyed liquid is very similar to the other embodiments. However, the step of applying 16 dyed liquid to the component 32 may be performed in a variety of ways such as, but not limited to: (1) brushing on a soapy-like dyed liquid onto the gas charged component 32; or (2) brushing on a dyed liquid onto the gas charged component 32. It is further understood that the pressurized gas 30 may exit the walls 46 of the component 32 anywhere there is a leak in the surface sealant. Accordingly, the operator is able to inspect the interior and exterior surfaces 80, 82 of the component 32 to locate a disruption or bubbles 54 emerging from the dyed liquid on the surface 80, 82 of the component 32 and thus, identify 20 a new leak 34 in each location where bubbles 54 or a disruption in the dyed liquid form.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing a leak tight component comprising the steps of:
   forming a component having an internal cavity and an external surface separated by walls possessing a porous structure;
   applying a first application surface sealant layer to the walls of the component;
   introducing a known leak to the surface sealant layer;
   providing pressurized gas into the porous structure of the walls of the component via the known leak;
   applying a liquid to the component while pressurized gas is flowing into the porous structure of the component via the known leak;
   inspecting the internal cavity and the external surface of the component for a plurality of bubbles;
   identifying a new leak area in the first application surface sealant layer;
   removing at least a substantial amount of the liquid from the component; and
   applying a second application surface sealant to the new leak area.

2. The method for manufacturing a leak tight component of claim 1 wherein the step of applying a liquid to the component uses a dyed liquid.

3. The method for manufacturing a leak tight component of claim 1 wherein the step of introducing a known leak includes the step of creating an access opening in the surface sealant.

4. The method for manufacturing a leak tight component of claim 1 wherein the step of introducing a known leak includes attaching an insert to the component thereby creating an access opening in the surface sealant layer.

5. The method for manufacturing a leak tight of claim 1 wherein the step of applying a first application surface sealant includes at least one of dipping, brushing or spraying the component with the surface sealant.

6. The method for manufacturing a leak tight component of claim 5 wherein the step of applying a second application surface sealant to the new leak areas includes the step of brushing the surface sealant onto the new leak area.

7. The method for manufacturing a leak tight component of claim 6 wherein the step of applying a liquid to the component includes the step of submerging the component in water.

8. The method for manufacturing a leak tight component of claim 7 wherein the pressurized gas is helium.

9. The method for manufacturing a leak tight component of claim 8 wherein the known leak is operatively configured to receive a sealed fitting means the sealed fitting means operatively configured to introduce the pressurized gas into the walls of the component.

10. The method for manufacturing a leak tight component of claim 9 wherein the step of introducing a known leak includes the step of creating an access opening in the first application surface sealant layer.

11. The method for manufacturing a leak tight component of claim 10 wherein the surface sealant is epoxy.

12. The method for manufacturing a leak tight component of claim 10 wherein the step of introducing a known leak includes attaching an insert to the component thereby creating an access opening in the surface sealant layer.

13. A method for manufacturing a leak tight component comprising the steps of:
   forming a component having an internal surface and an external surface separated by walls possessing a porous structure;
   applying a first application of surface sealant to the walls of the component to form a surface sealant layer;
   providing a pressurized gas into a known leak in the surface sealant layer for the component;
   submerging the component in a liquid while pressurized gas is flowing into the porous structure of the walls of the component via the known leak;
   inspecting the internal surface and the external surface of the component for the formation of bubbles;
   identifying a new leak on the component;
   removing at least a substantial amount of the liquid from the component; and
   applying a second application of surface sealant to the new leak area.

14. The method for manufacturing a leak tight component of claim 13 wherein the component is a 3D printed part formed by an fused deposition modeling machine.

15. The method for manufacturing a leak tight component of claim 13 wherein the step of applying a first application surface sealant includes dipping the component into the surface sealant.

16. The method for manufacturing a leak tight component of claim 15 wherein the step of applying a second application of surface sealant to the new leak areas includes the step of brushing the surface sealant onto the new leak area.

17. The method for manufacturing a leak tight component of claim 16 wherein the step of submerging the component in a liquid includes the step of submerging the component in water.

18. The method for manufacturing a leak tight component of claim 17 wherein the pressurized gas is helium.

19. The method for manufacturing a leak tight component of claim 18 wherein the known leak is operatively configured to engage with a sealed fitting means, the sealed fitting means operatively configured to supply the pressurized gas into a wall of the component.

* * * * *